Patented May 5, 1936

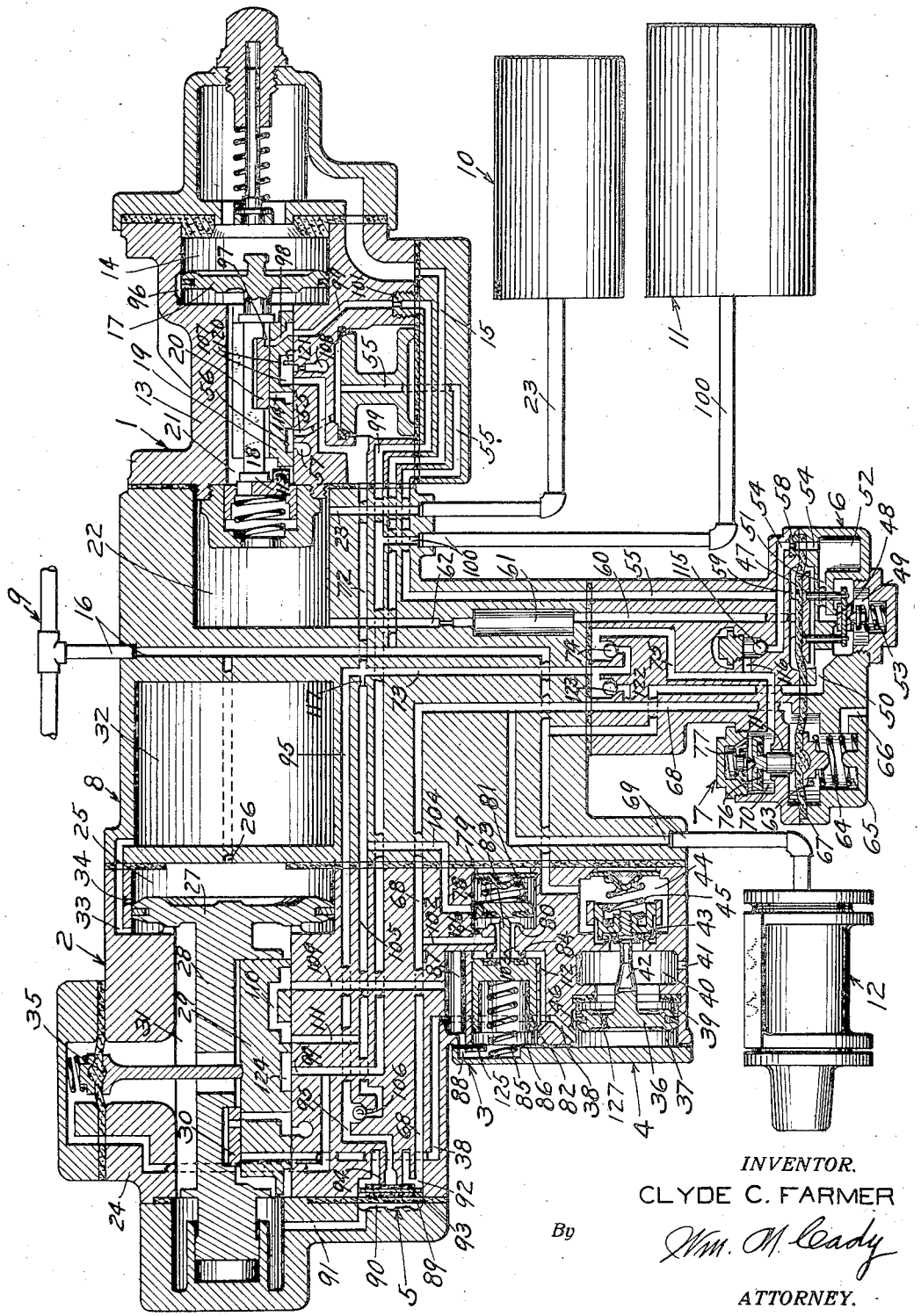

2,039,712

UNITED STATES PATENT OFFICE 2,039,712

FLUID PRESSURE BRAKE

Clyde C. Farmer, Pittsburgh, Pa., assignor to The Westinghouse Air Brake Company, Wilmerding, Pa., a corporation of Pennsylvania Application March 23, 1932, Serial No. 600,614
Renewed August 16, 1933

12 Claims. (Cl. 303—46)

This invention relates to fluid pressure brake equipment of substantially the same general type as that disclosed in my prior application, Serial No. 582,905, filed December 24, 1931, and which operates according to variations in brake pipe pressure to control the application and release of the brakes and relates more particularly to the means employed in such equipment for controlling the rate of increase in brake cylinder pressure in effecting applications of the brakes.

For the purpose of economy, there is a continuing tendency to increase the number of cars in a train and where heretofore a freight train might consist of one hundred cars, it is now desired to operate trains of one hundred fifty or more cars.

The brake equipment at present employed was originally designed to operate in trains up to one hundred cars, but with the continuing increase in train length, various operating difficulties are being encountered and especially in preventing the harsh run in or gathering of the slack in the train when service and emergency applications of the brakes are effected.

It has been found in effecting a service application of the brakes on a long train, that so long as the brake cylinder pressure on the cars at the front end of the train does not exceed the brake cylinder pressure on the cars at the rear end of the train by a certain degree, say for instance by fifteen pounds, the slack in the train will gather without causing harsh damaging shocks. In order to maintain the difference in brake cylinder pressure on the cars at the opposite ends of the train within this range it has heretofore been proposed, as disclosed in my application, Serial No. 587,476, filed January 19, 1932, to retard the rate of increase in brake cylinder pressure.

In the equipment disclosed in my above mentioned application, Serial No. 587,476, in effecting either a service or an emergency application of the brakes, there is an initial inshot of fluid under pressure to the brake cylinder of sufficient degree to move the brake cylinder piston outwardly so as to bring the usual brake shoes into braking engagement with the car wheels with sufficient force to set up a slight retardation for causing the slack in the train to begin to gather without severe shock, followed by a slow increase in brake cylinder pressure to assist in gently gathering the slack in the train and to bring the train to a stop. In this equipment the relatively slow increase in brake cylinder pressure following the initial inshot is at substantially the same rate in effecting either a service or an emergency application of the brakes and this rate of increase continues until the desired brake cylinder pressure is obtained.

In some cases it is desirable to effect an emergency application in a shorter time than such an application can be effected where the slow rate of increase in brake cylinder pressure is continued until full brake cylinder pressure is obtained. In order to meet this condition, I propose to effect the slow increase in brake cylinder pressure in effecting a service application at a rate which will prevent the slack in the train from gathering harshly and to effect the slow increase in brake cylinder pressure in effecting an emergency application at a faster rate than in service which, due to the rapid transmission of emergency action, will not cause the slack in the train to gather harshly.

Therefore, the principal object of my invention is to provide a fluid pressure brake equipment having improved means for varying the rate of increase in brake cylinder pressure in effecting both service and emergency applications of the brakes.

According to the above object, I provide means operative in effecting a service application of the brakes for supplying an initial inshot of fluid under pressure to the brake cylinder to move the brake cylinder piston outwardly so as to bring the usual brake shoes into braking engagement with the car wheels with sufficient force to set up a slight retarding action for causing the slack in the train to begin to gather, followed by a slow increase in brake cylinder pressure to so increase the braking force as to effect the gentle gathering of the slack in the train and to bring the train to a stop. I also provide means operative in effecting an emergency application of the brakes for increasing the brake cylinder pressure in three stages, the first stage being an initial inshot to apply the brakes to start the slack in the train to gather, followed by a slow increase which is at a faster rate than that of the slow increase in brake cylinder pressure in effecting a service application, for insuring the gentle gathering of the slack in the train, and the last stage being a final inshot of fluid under pressure to the brake cylinder after the slack in the train has had time to run in or gather.

Other objects and advantages will appear in the following more detailed description of the invention.

In the accompanying drawing the single figure is a diagrammatic view, mainly in section, of a fluid pressure brake equipment embodying my invention.

As shown in the drawing, the equipment may comprise a triple valve device 1, an emergency valve device 2, a combined emergency inshot and cut-off valve device 3, an emergency vent valve device 4, a timing valve device 5, a quick service valve device 6, a quick service modifying valve device 7, a pipe bracket 8, a brake pipe 9, an auxiliary reservoir 10, an emergency reservoir 11 and a brake cylinder 12.

The above mentioned devices are of substantially the same construction as the corresponding devices of the equipment shown and described in my aforementioned prior application and are carried by the pipe bracket 8 in substantially the same manner as described in said prior application.

The triple valve device 1 may be of any suitable type, but in the present embodiment of the invention is of the K type which has been converted, in the same manner as described in my prior application, for use in my improved equipment. This triple valve device comprises a casing 13 having a chamber 14 connected to the brake pipe 9 through a passage 15 and a passage and pipe 16, and containing a piston 17 having a stem 18 adapted to operate a main slide valve 19 and an auxiliary slide valve 20 contained in a valve chamber 21 connected to the auxiliary reservoir 10 by way of a chamber 22 in the pipe bracket 8 and a passage and pipe 23.

The emergency valve device 2 may comprise a casing 24 having a piston chamber 25 connected to the brake pipe passage 16 through a passage 26 and containing a piston 27 having a stem 28 adapted to operate a main slide valve 29 and an auxiliary slide valve 30 contained in a valve chamber 31 connected to a quick action chamber 32 in the pipe bracket through a passage 33. With the emergency piston in release position, as shown in the drawing, the piston chamber 25 is connected to the passage 33 and consequently to the valve chamber 31 through a restricted passage 34.

The main slide valve 29 of the emergency valve device is adapted to be urged into engagement with its seat by means of a mechanism 35, which is substantially the same in detail and function as the corresponding mechanism which is fully described in Ellis E. Hewitt Patent No. 1,920,939, issued August 1, 1933.

Associated with the emergency valve device and mounted in the casing 24 thereof is the quick action valve device 4, which may comprise a quick action piston 36 having a chamber 37 at one side open to the seat of the emergency slide valve 29 through a passage 38 and having at the other side a chamber 39 open to the atmosphere through a chamber 40 and a passage 41. The piston 36 is provided with a stem 42 which is operatively connected to a brake pipe vent valve 43 contained in a chamber 44 open to the brake pipe passage 16. The vent valve 43 is normally maintained closed by the action of a spring 45 contained in the chamber 44 and the quick action piston chamber 37 is normally open to the atmosphere by way of a feed groove 46 around the quick action piston, chambers 39 and 40 and passage 41.

The quick service valve device 6 is for the purpose of locally venting fluid under pressure from the brake pipe when a reduction in brake pipe pressure is initiated through the medium of the usual brake valve device (not shown) in effecting an application of the brakes, to propagate quick service action serially throughout the length of the train. This valve device may comprise a casing in which there is mounted a flexible diaphragm 47 adapted to control the operation of a quick service vent valve 48 contained in a chamber 49 connected with the brake pipe passage 16 through a passage 50. The valve 48 is operative to control communication from the chamber 49 to a passage 51 leading to a small quick service bulb or chamber 52 and is normally maintained closed by the action of a spring 53 contained in the valve chamber 49. With the triple valve device in release position as shown in the drawing, the quick service bulb 52 is open to the atmosphere through a passage 54, a passage 55, a cavity 56 in the main slide valve 19 and a passage 57, there being a choke plug 58 interposed in the passage 54.

At the other side of the flexible diaphragm 47 there is a chamber 59, which is connected through a passage 60 to a volume chamber 61 formed in the pipe bracket 8, said chamber 61 being open to the chamber 22 and consequently to the auxiliary reservoir 10, through a restricted passage 62.

The quick service modifying valve device 7 is for the purpose of limiting the local reduction in brake pipe pressure according to a predetermined increase in brake cylinder pressure and for the additional purpose of limiting the rapid initial inshot of fluid to the brake cylinder according to a predetermined increase in brake cylinder pressure. This device may comprise a casing in which is mounted a flexible diaphragm 63 which is subject on one side to the action of a coil spring 64 contained in a chamber 65 open to the atmosphere through a passage 66. At the other side of the diaphragm there is a chamber 67 which is open to the brake cylinder 12 through a passage 68 and a passage and pipe 69. The casing of the device is provided with a valve chamber 70 which is normally open to the diaphragm chamber 67 through a passage 71 and to which the usual brake cylinder supply and release passage 72 is open through a passage 73, past a ball check valve 74 and passage 75. A limiting valve 76 is contained in the valve chamber 70, which is adapted to be controlled by the action of the diaphragm 63 to open and close the communication from the valve chamber 70 to the diaphragm chamber 67 through passage 71. The valve 76 is subject on one side to the pressure of a light coil spring 77 which tends to seat the valve, and on the other side is subject, through the medium of the diaphragm 63, to the action of the spring 64, the pressure of said spring 64 being such as to normally maintain the valve unseated against the opposing pressure of the spring 77.

The inshot valve mechanism 3 and timing valve device 5 are contained in the casing of the emergency valve device and are operable only in effecting an emergency application of the brakes, to control the rate of flow of fluid under pressure to the brake cylinder. The inshot valve mechanism provides for an initial inshot of fluid under pressure to the brake cylinder and then operates to retard the rate of flow of fluid to the brake cylinder. At a predetermined time after the inshot valve mechanism operates to retard the rate of flow of fluid to the brake cylinder the timing valve device operates to provide a final inshot of fluid to the brake cylinder.

The inshot valve mechanism comprises a poppet valve 78 contained in a chamber 79 and adapted to be urged into engagement with a seat rib 80 by a spring 81, and also comprises a valve piston 82 having a projection 83 for moving the valve 78 from the seat rib 80. Normally the valve piston is urged into engagement with a seat rib 84 by the action of a spring 85 contained in a chamber 86 at one side of the valve piston. The valve piston, when in this position, maintains the valve 78 unseated. The chamber 86 is constantly open to a small chamber or reservoir 87 through a passage 88.

The timing valve device 5 comprises a flexible diaphragm 89 which is mounted in the triple valve casing. At one side of this diaphragm there is a chamber 90 connected to the emergency slide valve chamber 31 through a passage 91. At the other side of the diaphragm there is a chamber 92 which is connected to the brake cylinder passage 68 and which contains a valve 93 adapted to seat on a seat rib 94, the inner seated area of the valve being open to a passage 95 leading from the brake cylinder supply and release passage 72. The operation of the valve 93 is controlled by the action of the flexible diaphragm 89.

In operation, to initially charge the equipment, fluid under pressure is supplied to the brake pipe 9 in the usual manner and flows therefrom to the emergency piston chamber 25 by way of pipe and passage 16 and branch passage 26. From the passage 16 fluid under pressure flows to the triple valve piston chamber 14 through branch passage 15. Fluid under pressure also flows from the passage 16 to the vent valve chamber 44.

With the triple valve piston in full release position as shown in the drawing, fluid under pressure supplied to the piston chamber 14 flows therefrom to the valve chamber 21 and chamber 22 through a feed groove 96 around the piston and from thence to the auxiliary reservoir 10 by way of passage and pipe 23, thus charging the auxiliary reservoir. From the valve chamber 21, fluid under pressure flows to the emergency reservoir 11 by way of a cavity 97 in the auxiliary slide valve 20, a port 98 in the main slide valve 19, a passage 99 and a passage and pipe 100, there being a choke plug 101 interposed in the passage 99 controlling the rate of flow of fluid from the valve chamber 21, thus the emergency reservoir is charged.

From the chamber 22 fluid under pressure flows to the diaphragm chamber 59 in the quick service valve device 6 by way of restricted passage 62, chamber 61 and passage 60 and from the brake pipe passage 16 fluid under pressure flows to the valve chamber 49 in the quick service valve device, the spring 53 acting to maintain the valve 48 seated.

With the emergency piston 27 in release position as shown in the drawing, fluid under pressure supplied to the piston chamber 25 flows therefrom to the emergency valve chamber 31 and quick action chamber 32 by way of passages 34 and 33. From the valve chamber 31 fluid under pressure flows to the diaphragm chamber 90 of the timing valve device 5, causing the diaphragm 89 to act to maintain the valve 93 in sealing engagement with the seat rib 94.

In the release position of the triple valve device 1 the brake cylinder 12 is open to the atmosphere through pipe and passage 69, passage 68, a passage 122, past a ball check valve 123, passages 73 and 72, cavity 107 in the main slide valve 19, and passage 108, and is also open to the atmosphere through a branch passage 102, a passage 103, and valve chamber 79 in the inshot valve device 3, a passage 104, a passage 105, past a ball check valve 106, through passages 95 and 72, a cavity 107 in the main slide valve 19 and a passage 108.

The small chamber 87 and the connected inshot valve piston chamber 86 are open to the atmosphere through a passage 109, a cavity 110 in the emergency main slide valve 29, a passage 111, and the passage 105 through which the brake cylinder is open to the atmosphere, so that the spring 85 acts to urge the valve piston into engagement with the seat rib 84. In this position, the outer seated area of the valve piston is open to the chamber 86 and consequently to the atmosphere through a passage 112.

The inner seated area of the timing valve 93 is open to the atmosphere through the passage 95.

With the triple valve device in release position, the quick service bulb 52 is open to the atmosphere by way of passage 54, choke plug 58, passage 55, cavity 56 in the main slide valve 19 of the triple valve device and passage 57.

With the equipment thus charged with fluid under pressure, a service application of the brakes is effected upon a gradual reduction in brake pipe pressure in the usual well known manner, which results in a corresponding reduction in the pressure of fluid in the triple valve piston chamber 14, emergency piston chamber 25, and valve chamber 49 in the quick service valve device 6.

Upon a light reduction in the pressure of fluid in the triple valve piston chamber 14, fluid under pressure in the valve chamber 21 shifts the triple valve piston 17 and thereby the auxiliary slide valve 20 toward the right hand and relative to the main slide valve 19. In thus moving, the piston 17 closes the feed groove 96, so as to prevent the back flow of fluid under pressure from the valve chamber 21 to the piston chamber 14 and the auxiliary slide valve 20 laps the port 98 in the main slide valve 19, so as to prevent back flow of fluid under pressure from the emergency reservoir 11 to the valve chamber 21 in the triple valve device. After the feed groove 96 and port 98 have been closed, a shoulder 113 on the rear end of the piston stem 18 operatively engages the rear end of the main slide valve 19, at which time the rear end of the auxiliary slide valve 20 will have uncovered one end of the usual service port 114 in the main slide valve 19.

Upon a predetermined but light reduction in brake pipe pressure, and consequently in the pressure of fluid in the valve chamber 49 in the quick service valve device 6, fluid under pressure in the diaphragm chamber 59, acts to flex the diaphragm 47 inwardly which causes the quick service valve 48 to be unseated. With the valve 48 thus unseated, fluid under pressure is vented from the chamber 49 and consequently from the brake pipe to the quick service bulb 52 by way of passage 51. This produces a sudden limited local reduction in brake pipe pressure for accelerating the movement of the local triple valve parts to service application position and for also accelerating the movement of the triple valve parts and the operation of the quick service valve device on the next car of the train. Since the triple valve device and quick service valve device on each of the other cars of the train will function in a similar manner, a quick serial response to the brake pipe reduction is transmitted from one car to the next throughout the length of the train.

The initial quick service reduction in brake pipe pressure to the quick service bulb 52 is also effective in the triple valve piston chamber 14, so that fluid under pressure in the valve chamber 21 causes the triple valve piston 17 to promptly move to service position.

After the shoulder 113 on the rear end of the piston stem 18 engages the rear end of the main slide valve 19, the piston shifts both slide valves to service position. The main slide valve 19 in service position laps the passage 57 and the further reduction in brake pipe pressure is effected by the flow of fluid from the brake pipe to the brake cylinder 12 by way of passage 54, choke plug 58, a ball check valve 115, a passage 116, passage 75, valve chamber 70 in the quick service modifying valve device 7, past the unseated valve 76, passage 71, diaphragm chamber 67, passage 68 and passage and pipe 69. This final quick service flow of fluid from the brake pipe to the brake cylinder is limited to a slow rate by the choke plug 58. The reason for thus limiting the rate of flow being to dampen or smooth out surges of fluid in the brake pipe which may have been caused by the initial local venting of fluid from the brake pipe.

Further, with both slide valves in service position, the service port 114 in the main slide valve 19 registers with the passage 72 and since, as before described, the auxiliary slide valve 20 has previously uncovered this port, fluid under pressure flows from the valve chamber 21 and connected auxiliary reservoir 10 to the brake cylinder 12 by way of the service port 114, passage 72, passage 73, past the ball check valve 74, passage 75, valve chamber 70 in the quick service modifying valve device, past the unseated valve 76, passage 71, diaphragm chamber 67, passage 68 and passage and pipe 69, thus a service application of the brakes is initiated.

From the passage 72 fluid under pressure also flows to the brake cylinder by way of a restricted passage 117, passage 104, valve chamber 79 in the emergency inshot valve device 3, past the open valve 78, passage 103, passage 102, passage 68, and passage and pipe 69. Fluid under pressure supplied to the passage 105 also flows to the chamber 87 and connected valve piston chamber 86 in the inshot valve device 3 by way of passage 111, cavity 110 in the emergency slide valve 29, and passage 109.

Now when a predetermined fluid pressure has been developed in the brake cylinder 12, say for instance a pressure of ten pounds, fluid at brake cylinder pressure in the diaphragm chamber 67 in the valve device 7, causes the diaphragm 63 to flex inwardly, permitting the spring 77 to act to seat the valve 76, thus closing off communication from the valve chamber 70 to the diaphragm chamber 67, consequently closing off the flow of fluid under pressure from the auxiliary reservoir to the brake cylinder by way of the valve device 7 and also closing off the further quick service flow of fluid from the brake pipe to the brake cylinder.

With the valve 78 of the quick service modifying valve device 7 seated, the further flow of fluid from the auxiliary reservoir 10 to the brake cylinder is at a retarded rate as governed by the flow area of the passage 117.

In effecting a service application of the brakes, fluid at brake cylinder pressure in the passage 105 flows therefrom to the small reservoir 87 by way of passage 111, cavity 110 in the main slide valve 29, and passage 109, and from said chamber flows through passage 88 to the valve piston chamber 86 and from the chamber 86 flows to the outer seated area of the valve piston through passage 112. The inner seated area of the valve piston is subjected to the pressure of fluid at brake cylinder pressure by way of connected passages 68, 102, and 103, so that the fluid pressures acting on opposite sides of the valve piston are substantially equal. Due to this, the spring 85, acting through the medium of the valve piston and projection 83, maintains the inshot valve 78 unseated as shown in the drawing.

It will here be noted that, in effecting a service application of the brakes, there is an initial inshot of fluid under pressure from the auxiliary reservoir 10 to the brake cylinder 12, which is limited by the operation of the quick service modifying valve device 7 when the brake cylinder pressure is increased to ten pounds or to any other predetermined pressure. This inshot is of sufficient degree to move the brake cylinder piston outwardly so as to bring the usual brake shoes (not shown) into effective braking engagement with the car wheels with a moderate force, which is sufficient to effect the initial retardation of the train but insufficient to cause the slack in the train to run in harshly. When the valve device 7 operates and closes off the inshot the brake cylinder pressure is adapted to be increased at a slow rate by the flow of fluid through the passage 117. This slow build up of brake cylinder pressure and the consequent slow increase in braking force serves to assist in preventing the harsh run in of slack in the train.

To effect the release of the brakes, fluid under pressure is again supplied to the brake pipe 9 in the usual manner, which causes the triple valve piston 17 to move inwardly to either full release position as shown in the drawing or retarded release position, dependent upon the rate of increase in brake pipe pressure, the piston shifting the slide valves 19 and 20 to their release position.

With the triple valve parts in either full or retarded release position the equipment is recharged in substantially the same manner as before described in connection with the initial charging of the equipment. However, there is one difference in recharging and that is that fluid under pressure flows from the fully charged emergency reservoir to the auxiliary reservoir 10 until the pressures in these reservoirs are equal and then both reservoirs are fully charged by way of the feed groove 96.

With the slide valves 19 and 20 in full release position as shown in the drawing, fluid under pressure is discharged from the brake cylinder through the atmospheric communication before traced in connection with the initial charging of the equipment. With the slide valves in retarded release position the atmospheric communication is slightly different from that before traced, in that the connection between the brake cylinder passage 72 and the passage 108 leading to the atmosphere is made through the cavity 107, a restricted passage 120 and a cavity 121, all in the main slide valve 19, instead of through the cavity 107 only.

Further with the slide valves in either release position, fluid under pressure is vented from the quick service bulb 52 by way of passage 54, choke plug 58, passage 55, cavity 56 in the main slide valve and passage 57.

When the brake cylinder pressure is reduced to substantially ten pounds the spring 64 of the valve device 7 acts to flex the diaphragm outwardly, thereby unseating the valve 76 as shown in the drawing.

To effect an emergency application of the brakes, fluid under pressure is suddenly vented from the brake pipe 9 and consequently from the emergency piston chamber 25 and triple valve piston chamber 14. With the triple valve piston chamber 14 thus vented, the triple valve device operates to supply fluid under pressure from the auxiliary reservoir 10 to the brake cylinder 12 in the same manner as described in connection with the effecting of a service application of the brakes.

With the emergency piston chamber vented, the emergency piston moves outwardly to its extreme right hand position, shifting the slide valves 29 and 30 to their emergency position. The device in moving to emergency position supplies fluid under pressure from the emergency valve chamber 31 and quick action chamber 32 to the quick action piston chamber 37 in the usual manner, causing the vent valve device to operate to locally vent fluid under pressure from the brake pipe.

With the main emergency slide valve in emergency position, fluid under pressure flows from the emergency reservoir 11 to the brake cylinder 12 by way of pipe and passage 100, passage 99, a cavity 124 in the emergency main slide valve 29, passages 111, 105, and 104, valve chamber 79 in the combined inshot and cut-off valve device 3, past the unseated valve 78, passage 103, passage 102, passage 68 and passage and pipe 69. Fluid under pressure supplied to the passage 105 in the manner just described flows to the inner seated area of the timing valve 93, past the ball check valve 106 and through passage 95, thus the inner seated area of the timing valve is subject to the pressure of fluid being supplied to the brake cylinder from the auxiliary and emergency reservoirs. The outer seated area of the timing valve and flexible diaphragm 89 is also subject to fluid at the same pressure as supplied through the passage 68.

Passage 109 from the small reservoir 87 is lapped in the emergency position of the emergency slide valve 29, and since this passage was connected to the vented passage 105 in the release position of the triple valve device and emergency valve device, said reservoir 87 and connected valve piston chamber 86 are at atmospheric pressure when an emergency application of the brakes is effected. As a result of this, the inshot valve piston 82 is yieldably maintained in sealing engagement with the seat rib 84 only by the force of the spring 85.

When the pressure of fluid being supplied to the brake cylinder 12 through passage 103 and acting on the inner seated area of the inshot valve piston 82, becomes sufficiently great to overcome the opposing force of the spring 85, said valve piston starts moving toward the left hand. Upon breakage of the seal between the valve piston and the seat rib 84, the entire face of the valve piston is subjected to the pressure of fluid being supplied to the brake cylinder and is thereby rapidly moved into sealing engagement with a gasket 125.

As the valve piston 82 is thus moved the spring 81 acts to seat the valve 78, thereby closing the passage 103 and consequently cutting off the initial inshot of fluid under pressure to the brake cylinder. With the valve 78 seated, fluid under pressure continues to flow from the passage 104 and valve chamber 79 to the brake cylinder at a restricted rate through a restricted passage 126, passages 102 and 68 and passage and pipe 69, said passage 126 by-passing the valve 78.

With the emergency valve parts in emergency position, fluid under pressure is vented from the quick action chamber 32, emergency valve chamber 31 and timing diaphragm chamber 90 to the atmosphere by way of passage 38, quick action piston chamber 37, a choked port 127 in the quick action piston 36, chamber 40 and passage 41. Now when the pressure of fluid being supplied to the brake cylinder is slightly greater than the pressure of fluid in the diaphragm chamber 90 in the timing valve device, the timing valve will be caused to move to its unseated position establishing communication from the passage 95 to the passage 68 and consequently to the brake cylinder, so that fluid under pressure now flows at a fast rate to the brake cylinder until the pressures of the auxiliary reservoir, emergency reservoir and brake cylinder equalize. The flow of fluid through the port 127 in the quick action piston is at such a rate that the timing valve will be maintained closed for a predetermined period of time, say for instance about twenty seconds after the initiation of an emergency application.

From the above description of the operation of the equipment in effecting an emergency application of the brakes it will be understood, that although the supply of fluid under pressure to the brake cylinder is continuous from the time the application is initiated until the equalization of the pressures in the auxiliary reservoir, emergency reservoir and brake cylinder, the build up of brake cylinder pressure is in three distinct stages. First there is an initial quick inshot before the inshot valve 78 seats, then there is a slow build up through the restricted passage 126 after the valve 78 seats, and finally there is a rapid build up past the unseated timing valve 93. The initial inshot of fluid under pressure to the brake cylinder may be such as to insure a light brake cylinder pressure, say for instance about fifteen pounds, which will cause a slight retardation of the train to be set up for causing the slack in the train to start to gather without severe shocks. The slow build up through the restricted passage 126 may increase the brake cylinder pressure at a slow rate over a period of time of sufficient duration as to permit the train slack to completely gather, after which the timing valve device 3 functions to permit a final rapid increase in brake cylinder pressure for stopping the train.

The subject matter relating to the feature of controlling the build up of brake cylinder pressure in three stages in effecting an emergency application of the brakes is broadly claimed in my pending application, Serial No. 612,465, filed May 20, 1932.

It will here be noted that, in effecting an emergency application of the brakes, the quick service modifying valve closes when the brake cylinder pressure has been increased to ten pounds, but this will have no appreciable effect upon the initial inshot of fluid to the brake cylinder since the emergency inshot valve 78 does not seat until a higher brake cylinder pressure is developed.

To effect the release of the brakes after an emergency application, fluid under pressure is supplied to the brake pipe 9 and flows therefrom to the triple valve piston chamber 14 and to the emergency piston chamber 25. Fluid under pressure thus supplied to the triple valve piston chamber 14 causes the triple valve parts to move to release position as described in connection with the release of the brakes after a service application, and with said parts in release position fluid under pressure is discharged from the brake cylinder by way of pipe and passage 69, passage 122, past the ball check valve 123, passage 73 and passage 72 open to the atmosphere through the main slide valve 19 of the triple valve device and passage 108. Fluid under pressure supplied to the emergency piston chamber 25 causes the several parts of the emergency valve device to move to release position as shown in the drawing.

With the triple valve device and emergency valve device in release position, the equipment will be recharged with fluid under pressure in substantially the same manner as before described in connection with the initial charging.

As fluid under pressure is discharged from the brake cylinder in releasing an emergency application of the brakes, the several parts of the quick service modifying valve device, timing valve device 5 and inshot valve device 3 will be returned to their normal positions as shown in the drawing.

The ball check valve 74 interposed between the passages 74 and 75 prevents fluid under pressure from being locally vented from the brake pipe after the quick service modifying valve 76 is seated and the ball check valve 123 is to prevent the flow of fluid from the passage 73 to the brake cylinder passage 68 in effecting an application of the brakes. The check valve 106 prevents the flow of fluid from the passage 95 to the brake cylinder by way of passage 105, which if permitted would destroy the control of the rate of flow of fluid to the brake cylinder in effecting a service application of the brakes.

It will be understood that due to the rapid transmission of the emergency action throughout the length of the train in effecting an emergency application of the brakes, the slow increase in brake cylinder pressure may be at a faster rate than the rate of the slow increase in effecting a service application without causing the slack in the train to run in harshly so that in effecting an emergency application full brake cylinder pressure may be obtained in less time than would be the case if the rate of the slow increase were the same in effecting both service and emergency applications of the brakes. The restricted passage 117 controls the slow increase in brake cylinder pressure in effecting a service application of the brakes and the restricted passage 126 controls the slow increase in brake cylinder pressure in effecting an emergency application of the brakes, the passage 126 having a greater flow area than the restricted passage, so that in effecting an emergency application, the flow of fluid through the passage 126 will be at a faster rate than the flow of fluid through the passage 117 in effecting a service application of the brakes.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a fluid pressure brake equipment, the combination with a brake pipe, an auxiliary reservoir, a supplemental reservoir and a brake cylinder, of a valve mechanism operated upon a gradual reduction in brake pipe pressure for supplying fluid under pressure from the auxiliary reservoir to the brake cylinder to effect a service application of the brakes and operated upon a sudden reduction in brake pipe pressure for supplying fluid under pressure from the auxiliary reservoir and supplemental reservoir to the brake cylinder to effect an emergency application of the brakes, means normally establishing communication through which fluid supplied from the auxiliary reservoir flows to the brake cylinder and operable upon a predetermined increase in brake cylinder pressure in effecting a service application of the brakes for restricting the rate of flow of fluid from the auxiliary reservoir to the brake cylinder, and means operable upon a predetermined increase in brake cylinder pressure in effecting an emergency application of the brakes for restricting the flow of fluid to the brake cylinder, the last mentioned means comprising a normally open valve past which fluid supplied at said restricted rate, in effecting a service application of the brakes, flows to the brake cylinder.

2. In a fluid pressure brake equipment, the combination with a brake pipe and a brake cylinder, of a valve mechanism operated upon a gradual reduction in brake pipe pressure for supplying fluid under pressure to the brake cylinder to effect a service application of the brakes and operated upon a sudden reduction in brake pipe pressure for supplying fluid under pressure to the brake cylinder to effect an emergency application of the brakes, a normally unseated valve past which the initial flow of fluid to the brake cylinder in effecting a service application is at a fast rate, means operable upon a predetermined increase in brake cylinder pressure for seating said valve to close off the flow of fluid past the valve to the brake cylinder, means for retarding the rate of flow of fluid to the brake cylinder upon the seating of said valve, another normally open valve past which fluid supplied at said retarded rate, in effecting a service application, flows to the brake cylinder and past which fluid initially flows to the brake cylinder at a fast rate in effecting an emergency application, means operable upon a predetermined increase in brake cylinder pressure only in effecting an emergency application for seating said other valve, and means operative upon the seating of said other valve for retarding the rate of flow of fluid to the brake cylinder.

3. In a fluid pressure brake equipment, the combination with a brake pipe and a brake cylinder, of a valve mechanism operated upon a gradual reduction in brake pipe pressure for supplying fluid under pressure to the brake cylinder to effect a service application of the brakes and operated upon a sudden reduction in brake pipe pressure for supplying fluid under pressure to the brake cylinder to effect an emergency application of the brakes, a normally unseated valve past which the initial flow of fluid to the brake cylinder in effecting a service application is at a fast rate, means operable upon a predetermined increase in brake cylinder pressure for seating said valve to close off the flow of fluid past the valve to the brake cylinder, means for retarding the rate of flow of fluid to the brake cylinder upon the seating of said valve, another normally open valve past which fluid supplied at said retarded rate, in effecting a service application, flows to the brake cylinder and past which fluid initially flows to the brake cylinder at a fast rate in effecting an emergency application, means operable upon a predetermined increase in brake cylinder pressure only in effecting an emergency application for seating said other valve, and means operative after said other valve is seated for varying the rate of flow of fluid to the brake cylinder.

4. In a fluid pressure brake equipment, the combination with a brake pipe and a brake cylinder, of a valve mechanism operated upon a gradual reduction in brake pipe pressure for supplying fluid under pressure to the brake cylinder to effect a service application of the brakes and operated upon a sudden reduction in brake pipe pressure for supplying fluid under pressure to the brake cylinder to effect an emergency application of the brakes, means operable in effecting a service application for retarding the rate of flow of fluid to the brake cylinder to effect a slow increase in brake cylinder pressure, and means through which fluid flows at said retarded rate to the brake cylinder operable in effecting an emergency application to retard the flow of fluid to the brake cylinder to effect a slow increase in brake cylinder pressure at a faster rate than the rate of the slow increase in brake cylinder pressure in effecting a service application.

5. In a fluid pressure brake equipment, the combination with a brake pipe and a brake cylinder, of a valve mechanism operated upon a gradual reduction in brake pipe pressure for supplying fluid under pressure to the brake cylinder to effect a service application of the brakes and operated upon a sudden reduction in brake pipe pressure for supplying fluid under pressure to the brake cylinder to effect an emergency application of the brakes, fluid under pressure being supplied, both in effecting a service and an emergency application, through a passage permitting a rapid flow and through two restricted communications, means operated upon a predetermined increase in brake cylinder pressure in effecting a service application for cutting off the flow of fluid through said passage to the brake cylinder at a fast rate, and means operated upon a predetermined increase in brake cylinder pressure in effecting an emergency application for cutting off the flow of fluid through said passage to the brake cylinder at a fast rate.

6. In a fluid pressure brake equipment, the combination with a brake pipe and a brake cylinder, of a valve mechanism operated upon a gradual reduction in brake pipe pressure for supplying fluid under pressure to the brake cylinder to effect a service application of the brakes and operated upon a sudden reduction in brake pipe pressure for supplying fluid under pressure to the brake cylinder to effect an emergency application of the brakes, fluid under pressure being supplied, both in effecting a service and an emergency application, through a passage permitting a rapid flow and through two restricted communications, means operated upon a predetermined increase in brake cylinder pressure in effecting a service application for cutting off the flow of fluid through said passage to the brake cylinder at a fast rate, and means operated upon a predetermined increase in brake cylinder pressure in effecting an emergency application for cutting off the flow of fluid through said passage to the brake cylinder at a fast rate, one of said restricted communications controlling the rate of flow of fluid to the brake cylinder when said passage is closed by the first mentioned means and the other of said restricted communications controlling the rate of flow of fluid to the brake cylinder when said passage is closed by the second mentioned means.

7. In a fluid pressure brake equipment, the combination with a brake pipe and a brake cylinder, of a valve mechanism operated upon a gradual reduction in brake pipe pressure for supplying fluid under pressure to the brake cylinder to effect a service application of the brakes and operated upon a sudden reduction in brake pipe pressure for supplying fluid under pressure to the brake cylinder to effect an emergency application of the brakes, fluid under pressure being supplied, both in effecting a service and an emergency application, through a passage permitting a rapid flow and through two restricted communications, means operated upon a predetermined increase in brake cylinder pressure in effecting a service application for cutting off the flow of fluid through said passage to the brake cylinder at a fast rate, and means operated upon a predetermined increase in brake cylinder pressure in effecting an emergency application for cutting off the flow of fluid through said passage to the brake cylinder at a fast rate, one of said restricted communications controlling the rate of flow of fluid to the brake cylinder when said passage is closed by the first mentioned means and the other of said restricted communications controlling the rate of flow of fluid to the brake cylinder when said passage is closed by the second mentioned means, the last mentioned communication permitting a more rapid flow of fluid to the brake cylinder than is permitted by the first mentioned communication.

8. In a fluid pressure brake equipment, the combination with a brake pipe and a brake cylinder, of a valve mechanism operated upon a gradual reduction in brake pipe pressure for supplying fluid under pressure to the brake cylinder to effect a service application of the brakes and operated upon a sudden reduction in brake pipe pressure for supplying fluid under pressure to the brake cylinder to effect an emergency application of the brakes, means automatically operable in effecting a service application of the brakes for varying the rate of flow to the brake cylinder to increase the brake cylinder pressure in two stages, and means normally establishing communication through which, in effecting a service application, fluid flows to the brake cylinder and which is operated automatically upon a predetermined increase in brake cylinder pressure only in effecting an emergency application for varying the rate of flow of fluid to the brake cylinder to increase the brake cylinder pressure in three stages.

9. In a fluid pressure brake equipment, in combination, a brake pipe, a brake cylinder, valve means operative upon a reduction in brake pipe pressure in effecting either a service application of the brakes or an emergency application of the brakes to supply fluid under pressure to the brake cylinder, and means for controlling the rate of flow of fluid to the brake cylinder, said means operating differently in effecting service and emergency applications of the brakes to provide an increase in brake cylinder pressure in a plurality of certain stages in effecting a service application of the brakes and, in effecting an emergency application of the brakes, to provide an increase in brake cylinder pressure in a plurality of stages differing from said certain stages.

10. In a fluid pressure brake equipment, in combination, a brake pipe, a brake cylinder, valve means operative upon a reduction in brake pipe pressure in effecting either a service application of the brakes or an emergency application of the brakes to supply fluid under pressure to the brake cylinder, and means for controlling the rate of flow of fluid to the brake cylinder, said means operating differently in service and emergency applications of the brakes to provide a two stage increase in brake cylinder pressure in effecting a service application of the brakes and, in effecting an emergency application of the brakes, to provide a three stage increase in brake cylinder pressure.

11. In a fluid pressure brake equipment, in combination, a brake pipe, a brake cylinder, valve means operative upon a reduction in brake pipe pressure in effecting either a service application of the brakes or an emergency application of the brakes to supply fluid under pressure to the brake cylinder, and means for controlling the rate of flow of fluid to the brake cylinder, said means being operative by fluid at brake cylinder pressure and controlled by said valve means to operate differently in effecting service and emergency applications of the brakes to provide an increase in brake cylinder pressure in a plurality of certain stages in effecting a service application of the brakes and, in effecting an emergency application of the brakes, to provide an increase in brake cylinder pressure in a plurality of stages differing from said certain stages.

12. In a fluid pressure brake equipment, in combination, a brake pipe, a brake cylinder, valve means operative upon a reduction in brake pipe pressure in effecting either a service application of the brakes or an emergency application of the brakes to supply fluid under pressure to the brake cylinder, and means for controlling the rate of flow of fluid to the brake cylinder, said means comprising a valve mechanism controlled by brake cylinder pressure to provide an increase in brake cylinder pressure in a plurality of stages in effecting a service application of the brakes and also comprising a valve mechanism controlled by brake cylinder pressure and the operation of said valve means to provide an increase in brake cylinder pressure in a plurality of stages in effecting an emergency application of the brakes.

CLYDE C. FARMER.